United States Patent [19]

Binard

[11] 3,908,656
[45] Sept. 30, 1975

[54] ACTIVATING MEANS FOR VENTED CHAMBERS
[75] Inventor: William J. Binard, Barrington, Ill.
[73] Assignee: The Kendall Company, Boston, Mass.
[22] Filed: Nov. 23, 1973
[21] Appl. No.: 418,227

[52] U.S. Cl. .................. 128/275; 4/110; 128/295; 137/588
[51] Int. Cl.² .................. F16K 24/00; F16L 55/07
[58] Field of Search ............... 4/110; 137/587, 588; 150/1; 128/275, 295; 220/44 A; 229/62.5

[56] References Cited
UNITED STATES PATENTS

| | | | |
|---|---|---|---|
| 1,722,921 | 7/1929 | Johnson | 220/44 A |
| 3,019,807 | 2/1962 | Projahn | 137/588 |
| 3,044,505 | 7/1962 | Iketani | 137/588 |
| 3,357,429 | 12/1967 | Folkman et al. | 128/275 |
| 3,529,599 | 9/1970 | Folkman et al. | 128/275 |
| 3,583,401 | 6/1971 | Viliancourt | 128/275 |
| 3,631,877 | 1/1972 | Barosko | 137/588 |
| 3,740,770 | 6/1973 | Villari | 128/295 |

Primary Examiner—Martin P. Schwadron
Assistant Examiner—George L. Walton
Attorney, Agent, or Firm—Edward J. Scahill, Jr.

[57] ABSTRACT

A venting means for closed system drainage devices utilizing a drip chamber and anti-reflux mechanism can be activated, when blocked by the filter system therein coming in contact with the rising fluid within the drip chamber, by using air as the activating means therefor. The drip chamber is constructed so that an air pocket is created above a filter system that is positioned circumferentially around the chamber at a height that is at least the same as or higher than the lowermost portion of the drip tube entering from the top of the chamber. Upon contact of the filter material by the rising fluid, as described above, the surface tension created thereacross can be broken by simply tilting or otherwise slightly moving the chamber and causing the entrapped air to cut through the surface tension and thereby once again open the filter material to permit a venting action to take place.

7 Claims, 9 Drawing Figures

U.S. Patent  Sept. 30,1975  3,908,656
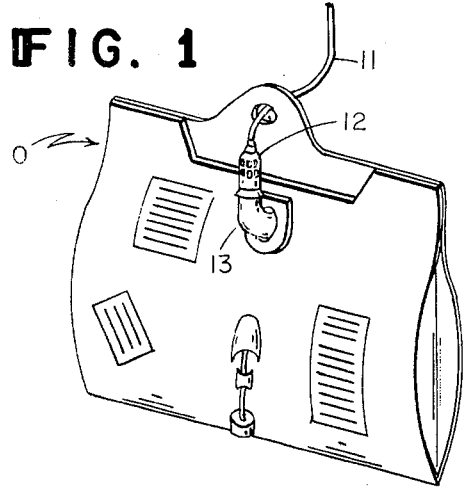
FIG. 1
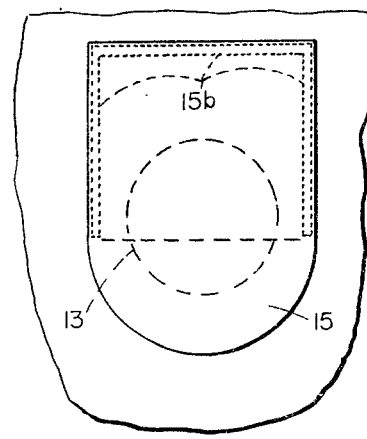
FIG. 3
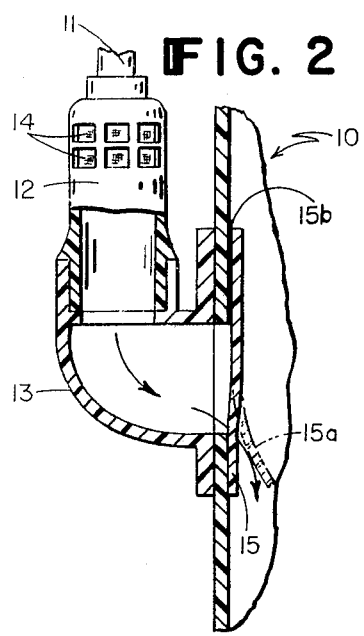
FIG. 2
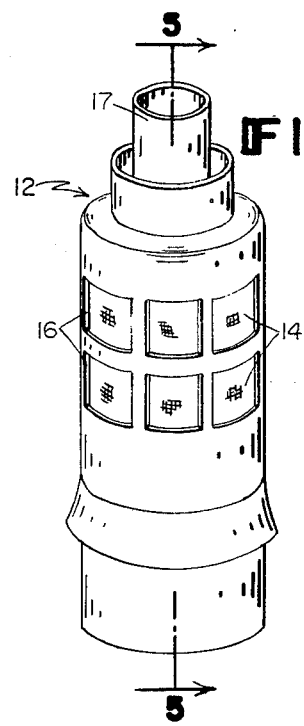
FIG. 4
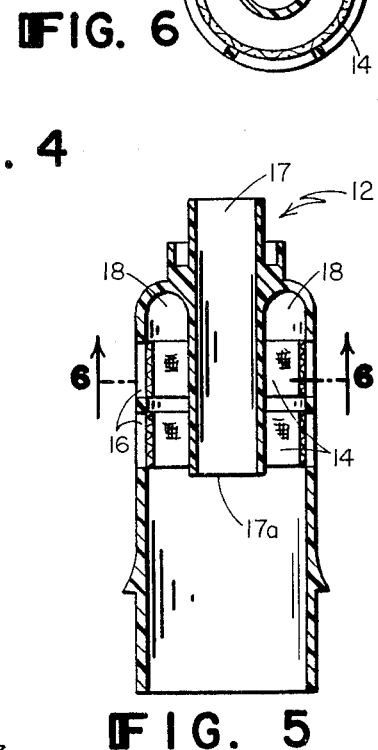
FIG. 5
FIG. 6
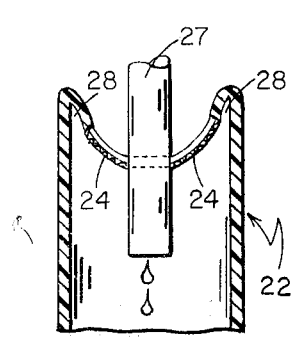
FIG. 7
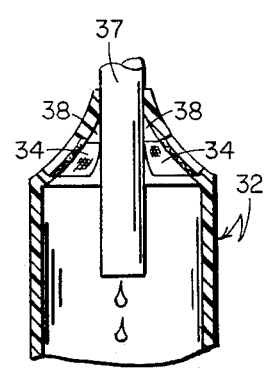
FIG. 8
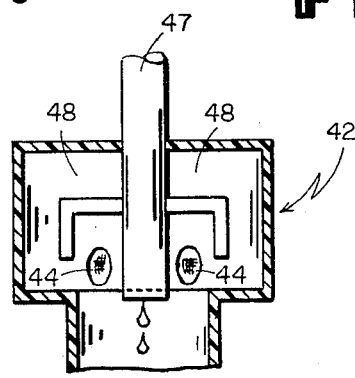
FIG. 9

ACTIVATING MEANS FOR VENTED CHAMBERS

BACKGROUND OF THE INVENTION

This invention relates to body fluid collection bags, and more particularly to an activating means for vented chambers used in conjunction with urinary collection bags having anti-reflux valves.

In the past, rigid type collection containers were used to collect body drainage fluids, and reflux was not a problem except for when the container was actually inverted. However, since the advent of disposable, flexible collection bags, the likelihood of reflux of the collected waste occurring and backing up into the drainage line has increased significantly. Any external force or resultant internal positive pressure, as well as inversion, can induce reflux which may possibly contaminate the entire drainage system and create many other such difficulties.

To combat this problem various devices have been suggested which shield the inlet tube or drip chamber, in some fashion, permitting the flow of fluids into the collection bag while attempting to restrict the reflux of these liquids back up into the drip chamber, the tubing and back to the patient. One such device is shown and descirbed in a co-pending application of common assignee, Ser. No. 363,614, filed May 24, 1973, wherein a flap-valve is placed over the inlet opening of the bag that is free to open into the bag when a liquid passes therethrough, but which closes shut when the bag pressure exceeds the input or drain line pressure and remains closed until the bag pressure drops below the line pressure. However, drip chambers used in these types of devices must be vented to work properly.

In biological liquid flow systems, the valve of a drip chamber has been established as a primary barrier to retrograde contamination of the conduits by migrating bacterial organisms. In drainage systems employing a drip chamber and an anti-reflux mechanism such as one-way valves, the displacement of air from the drip chamber to the inlet tubing invariably occurs as initial liquid flow equilibrates the system. The space occupied by the displaced air is in turn, replaced by liquid of the same volume if the chamber is not vented and by air if the chamber is vented. A vented drip chamber prevents the build up of negative pressure within the valved inlet and the subsequent retention of liquids therein, which would otherwise interfere with the integrity, and hence, the function of a drip chamber, i.e., to provide a bacterial barrier.

Also, after equilibration of pressures has been established, operating sensitivities of such one-way valves as are found in the anti-reflux devices may be altered due to the nature of the liquid passing through them. Changes in the sealing characteristics are thus incurred, due to deposition of matter on the valve interfaces. Such changes may result in imperfect seals causing back flow, leakage or in a resistance to opening causing accumulation of effluent liquid within the drip chamber, as the valve response sensitivity is lowered.

Activation of the venting property of a vented chamber is normally a function of the vent's or filter's sensitivity used for vents in response to a change in pressure directly acting upon it. However, in circumstances wherein the liquid required to develop the negative pressure has completely contacted all available surface area of the vent, such as in air-liquid displacemet, loss of one-way valve sensitivity, over-filling, inversion, repositioning of the gravity dependent liquid, etc., another force, and often overriding force, comes into play and this phenomenon is liquid adsorption onto the filter means. In order to break this surface adsorption and allow venting action to occur within the chamber, some means must be provided internally to interrupt or break the surface tension of the liquid acting at the vent or filter interface.

Accordingly, it is an object of this invention to provide a means of breaking the surface tension of a liquid acting at the vent or filter interface of a vented drip chamber.

It is another object of this invention to provide an inexpensive means for preventing complete adsorption from occurring in vented chambers and/or breaking the liquid surface tension once formed therein.

It is a further object of the present invention to use air as the means for activating vented drip chambers.

SUMMARY OF THE INVENTION

A vented drip chamber for urinary collection bags is constructed so as to entrap air in an upper portion thereof that is positioned above vents therein, so as to prevent complete adsorption from occurring therein. Vents or filter-like material are positioned circumferentially around a portion of the chamber at a height that is at least the same as or higher than the lowermost portion of a drip tube entering from the top of the chamber. As the vents may come in contact with the liquid entering the chamber, a surface tension may be created thereon that would prevent a venting action from being properly carried out. In this event, any slight movement or simple tilt of the chamber out of perpendicularity to gravity will cause the entrapped air to dissect the surface tension across the filter-like material thereby enabling a proper venting action to resume within the chamber.

BRIEF DESCRIPTION OF THE DRAWINGS

FIG. 1 shows a perspective view of a urinary collection bag utilizing a vented chamber of this invention;

FIG. 2 is a partially exposed sectional view of the vented chamber of this invention mounted on an inlet connecting tube of a drainage bag and further showing a flap valve device thereon;

FIG. 3 is a rear view of the flap valve used with this invention;

FIG. 4 is a perspective view of a vented chamber of this invention;

FIG. 5 is a cross-sectional view of the vented chamber shown in FIG. 4;

FIG. 6 is a top sectional view of the vented chamber of FIG. 5, along line 6—6;

FIG. 7 is a sectional view of another embodiment of this invention;

FIG. 8 is a sectional view of still another embodiment of the present invention; and, FIG. 9 is a sectional view of yet another embodiment of this invention.

DESCRIPTION OF THE PREFERRED EMBODIMENTS

Closed system drainage devices using drip chambers therein may in some cases use a means therewith to prevent the waste fluids or liquids within the bag from backing up into the drain tube and even back to the patient or person using the drainage device. One such system is shown and described in a co-pending application of common assignee, Ser. No. 363,614, filed May 24, 1973, wherein a flap-valve is placed over the inlet opening of a urinary collection bag in order to prevent reflux action from taking place therein. The valve is free to open into the bag when a liquid passes therethrough, but closes shut when the bag pressure exceeds the input or drain line pressure and remains closed until the bag pressure drops below the line pressure.

Referring to the drawings, FIGS. 1, 2 and 3 show such a device wherein a urinary collection bag 10 has a drain tube 11 attached to a drip tube within the vented chamber 12 of this invention. The chamber 12 is disposed on an inlet connector 13 attached to the bag 10. A flap-valve 15 is secured to the back portion of the inlet connector 13 from within the bag 10 so that only the bottom portion of the flap-valve 15 is free to move inwardly, such as at 15a, and the valve is positioned thereon so that a liquid dripping into the system can flow out of the inlet connector 13 past the lower most portion of the valve 15 and into the collection bag 10.

However, drip chambers used in these types of devices must be vented to work properly. Activation of the venting property of a vented chamber is normally a function of the filter's sensitivity used for vents in response to a change in pressure acting directly on it. However, it has been found that in circumstances wherein the liquid required to develop the negative pressure has completely contacted all available surface area of the vent, such as in air-liquid displacement, faulty valves, overfilling, inversion, repositioning of the gravity dependent liquid, etc., another force, often overriding force, comes into play and this phenomenon is adsorption. Therefore, in order to break the surface adsorption and to allow venting action to occur within the system, a new vented chamber was constructed as described in this invention.

FIGS. 4, 5 and 6 show such a chamber 12, wherein a filter or venting material 14 is circumferentially attached within the chamber 12 on an upper portion thereof. The chamber 12 itself is of an at least semi-rigid material and is constructed to have a plurality of openings or windows thereon, such as shown by 16, which are to be covered on the inside by the venting material 14. While it would be possible to have a single, rather large window thereon instead of the aforementioned plurality of same, it is preferred to have the chamber 12 be constructed so that there is some bridging material of the chamber itself covering portions of the venting material 14. This type construction enhances the easy handling of the chamber by reducing the possibility of puncturing or damaging the venting material 14 during handling. In other words, the larger and more unprotected an area of venting material present, the greater the likelihood of damaging or puncturing same. Alternatively, the venting material may be used as a plurality of pieces placed around the circumference of the chamber, rather than a continuous sheet as stated above.

The chamber 12 should have an opening at both ends thereof so that a drip tube 17 can be placed into what is referred to as the uppermost portion thereof and extend downwardly into the chamber; the lowermost portion 17a of the drip tube 17 should be at least as low as or lower than the bottom of the venting means or material. Liquid passing therethrough may then drip down through the other open end of the chamber and into the bag 10 after passing through the inlet connector 13 and the flap-valve 15.

Under the principle of this invention, if the venting material becomes blocked, via adsorption as described above or the like, it can once again be opened or activated using air as the activating means. Air-traps, such as at 18, can be formed in a concave-like portion of the chamber 12 at a point above the venting material so that a slight tilting or other simple movement will cause the entrapped air to cut through the surface adsoprtion across the venting material, thereby activating the venting property of the chamber. This functional improvement is most effective where vent sensitivities are of a very small magnitude and the amount of surface adsorption interference is thus great, as in vented drip chambers.

FIGS. 7, 8 and 9 show alternative embodiments of a vented chamber as described in this invention. For example, in FIG. 7 a drip tube 27 extends down into a vented chamber 22 to a point beyond the venting material 24. Air-traps are formed in the concave-like portions 28 of the vented chamber 22 situated above the venting material 24. FIG. 8 shows a vented chamber 32 wherein the drip tube 37 extends into the chamber to a point beyond the venting material 34, and having concave-like portions 38 positioned above the vents to act as air-traps that will activate or open a blocked vent. And, finally, FIG. 9 shows a further embodiment wherein a drip tube 47 extends into the chamber 42 to a point equal to the lowermost portion of the vents 44 therein and has concave-like portions 48 therein that act as air-traps that, upon tilting, will cut through surface adsorption on the venting material 44. FIG. 9 further illustrates that the activating means need not be contained within the chamber.

The venting material 14, 24, 34 and 44 may be of any porous material capable of passing air therethrough, such as a porous plastic material or any type of synthetic fiber-like material, or the like. However, this material should also be capable of screening out contaminating bacterial organisms.

The above-described specific embodiments of the invention have been set forth for the purposes of illustration. It will be apparent to those skilled in the art that various modifications may be made in the structure of the system without departing from the principles of this invention as pointed out and disclosed herein. For that reason, it is not intended that the invention should be limited other than by the scope of the appended claims.

What is claimed is:

1. A vented chamber in a body fluid collection bag having an anti-reflux means thereon comprising:
   a flexible-walled body fluid collection bag having an opening on an upper portion thereof;
   a semirigid chamber disposed on said bag in working relationship with an inlet connector on said bag and with said opening thereon, said semirigid chamber having an anti-reflux means in working relation with said bag and having an opening at both ends thereof, the opening at the uppermost portion thereof having a drip tube extending down into said chamber;
   venting means positioned on said chamber at a height that is at least the same as or higher than the lowermost portion of said drip tube extending therein;
   an air-trap positioned within said chamber at a location therein above said venting means; and, means for activating the vented chamber comprising entrapped air within said air-trap for activating said venting means by cutting through any surface adsorption formed thereacross upon any tilting movement of said chamber; and, securing means on the lower opened end of said chamber for attaching said chamber to said inlet connector on said body fluid collection bag.

2. The chamber of claim 1 wherein said venting means is a porous material circumferentially placed within said chamber and further includes at least one opening on said chamber in congruous relationship with said porous material.

3. The chamber of claim 1 wherein said venting means is a plurality of pieces of porous material circumferentially placed within said chamber and further includes a plurality of openings on said chamber in congruous relation with said porous material.

4. The chamber of claim 2 wherein said venting means is a sheet of porous plastic material.

5. The chamber of claim 2 wherein said venting means is a synthetic fiber-like material.

6. The chamber of claim 4 wherein said securing means includes a friction-fitted portion thereon tapered to tightly fit into a tubular inlet connector on said collection bag.

7. A vented chamber in a body fluid collection bag having an anti-reflux means thereon comprising:

a flexible-walled body fluid collection bag having an opening on an upper portion thereof;

a semirigid chamber disposed on said bag in working relationship with an inlet connector on said bag and with said opening thereof, said semirigid chamber having an anti-reflux means in working relation therewith and having an opening at both ends thereof, the opening at the uppermost portion thereof having a drip tube extending down into said chamber, said chamber having at least one opening therein at a height that is at least the same as or higher than the lowermost portion of said drip tube extending therein;

a porous venting material circumferentially disposed within said chamber in congruous relationship with said at least one opening;

a concave-like air-trap positioned within said chamber at a location therein directly above said porous venting means for activating the vented chamber comprising entrapped air within said air-trap for activating said venting means by cutting through any surface adsorption formed thereacross upon any tilting movement of said chamber; and, a friction fitted portion on the lower opened end of said chamber tapered to tightly fit into a tubular inlet connector on said body fluid collection bag.

* * * * *